United States Patent
Nitzan et al.

(10) Patent No.: US 6,833,008 B2
(45) Date of Patent: Dec. 21, 2004

(54) SURFACE TREATMENT FOR PRINTING APPLICATIONS USING WATER-BASED INK

(75) Inventors: Boaz Nitzan, Ganey-Tikva (IL); Guy Peled, Herzlia (IL); Naama Schur, Ra'anana (IL); Moshe Frenkel, Jerusalem (IL)

(73) Assignee: Aprion Digital Ltd., Netanya (IL)

( * ) Notice: Subject to any disclaimer, the term of this patent is extended or adjusted under 35 U.S.C. 154(b) by 214 days.

(21) Appl. No.: 10/045,150

(22) Filed: Jan. 15, 2002

(65) Prior Publication Data

US 2002/0192381 A1 Dec. 19, 2002

Related U.S. Application Data (60) Provisional application No. 60/261,267, filed on Jan. 16, 2001.

(51) Int. Cl.$^7$ ............................. D06P 5/15; C09B 69/10
(52) U.S. Cl. ............................. 8/508; 8/511; 347/100; 106/31.43
(58) Field of Search ....................... 347/100; 106/31.43, 106/31.86, 31.58; 524/556, 555, 548; 8/508, 511; 523/161

(56) References Cited

U.S. PATENT DOCUMENTS

| | | | |
|---|---|---|---|
| 4,070,322 A | * | 1/1978 | Hwang et al. ............... 524/364 |
| 4,381,185 A | | 4/1983 | Swanson et al. |
| 4,892,775 A | * | 1/1990 | Song .......................... 428/32.1 |
| 5,648,164 A | | 7/1997 | Sakaki et al. |
| 5,706,042 A | | 1/1998 | Takeyama et al. |
| 5,948,512 A | | 9/1999 | Kubota et al. |
| 5,985,975 A | | 11/1999 | Kurabayashi et al. |
| 6,059,868 A | | 5/2000 | Kasperchik |
| 6,080,229 A | | 6/2000 | Watanabe et al. |
| 6,084,619 A | | 7/2000 | Takemoto et al. |
| 6,086,197 A | | 7/2000 | Kubota et al. |
| 2002/0052439 A1 | | 5/2002 | Farooq |

FOREIGN PATENT DOCUMENTS

| | | |
|---|---|---|
| EP | 0 534 634 | 3/1993 |
| EP | 0 857 571 | 8/1998 |
| EP | 1 041 126 | 10/2000 |
| EP | 1 125 760 | 8/2001 |
| JP | 05-202328 | 8/1993 |
| JP | 07-157668 | 8/1995 |

OTHER PUBLICATIONS

Database WPI, Section Ch, Week 198904, Derwent Publications Ltd., London, GB, AN 1989–027441, XP–002249521 & JP 63 299970 (RICOH KK), Dec. 7, 1988.

* cited by examiner

*Primary Examiner*—Gregory Webb
(74) *Attorney, Agent, or Firm*—Eitan, Pearl, Latzer & Cohen Zedek, LLP (57) ABSTRACT

The surface treatment for printing applications using water-based ink of the present invention comprises a surface pretreatment of the recording media prior to the deposition of the ink on the surface, wherein the pretreatment liquid is an aqueous and/or alcoholic solution or emulsion containing a polyvalent metal salt, and at least one of an organic swelling reagent and a coalescence reagent. The pretreatment liquid is applied with a rubbing motion in a thin layer of approximately 4 $\mu$m to the entire upper surface of the recording media. The swelling reagent and/or the coalescence reagent cause the upper 3–5 $\mu$m to swell and the polyvalent metal cations become embedded in the surface. After partial drying of the pretreated media, ink composition is deposited onto the surface to form an image. The ink solids precipitate in response to the embedded cations deposited in the pretreatment, and form interactions above and below the surface of the media to give a mechanically stable ink dot. After drying at temperatures high enough to evaporate the swelling reagent and/or the coalescence reagent, the ink dot remains embedded in the surface of the media.

11 Claims, 8 Drawing Sheets

Table 1

| Company | Application | Grade | Treated | Dot diameter |
|---|---|---|---|---|
| Speciality Coating | Wall cover | 90/90 SMW3 | non | 70 μm |
| | | | Treated | 60 μm |
| Speciality Coating | Wall cover | 90/90 Standar 182 | non | 70 μm |
| | | | Treated | 65 μm |
| Speciality Coating | Wall cover | 90/90 XER3 | non | 75 μm |
| | | | Treated | 65 μm |
| Speciality Coating | Wall cover | 80/90 DT319 | non | 70 μm |
| | | | Treated | 60 μm |
| Speciality Coating | Wall cover | 90/120 LTE 15 | non | 75 μm |
| | | | Treated | 60 μm |
| FORBO | Wall cover | Vinyl 90/90 | non | 70 μm |
| | | | Treated | 60 μm |
| Chamberlin | Wall cover | CP 90/90 | non | 75 μm |
| | | | Treated | 65 μm |
| Borasrtapeter | Wall cover | 4811 Non Woven Lystil | non | 85 μm |
| | | | Treated | 75 μm |

Table 2

| Company | Application | Grade | Coating | Print quality | Dot diameter | Optical density |
|---|---|---|---|---|---|---|
| Multi Fix | Self-Adhesive | Digital white - premium | Base | Bad | Impossible to measure | |
| | | | treated | good | | |
| Formely Meyercord International Inc. | Self-Adhesive | 72 A, premium vinyl | Base | Bad | Impossible to measure | |
| | | | treated | good | | |
| BUSmark | Self-Adhesive | FLXcon | Base | Bad | Impossible to measure | |
| | | | treated | Good | | |
| Jac | Self-Adhesive | SERILUX, 70100, DURO-E 110 | Base | Bad | Impossible to measure | |
| | | | treated | good | | |
| | | SERILUX, 72100, DURO-E 110 | Base | Bad | Impossible to measure | |
| | | | treated | good | | |
| | | SIGN INKJET, 70102, NONPERM A5 | Base | Bad | Impossible to measure | |
| | | | treated | good | | |
| Mactac | Self-Adhesive | MACSCREEN, 8129 | Base | Bad | 60 µm | not measurable |
| | | | treated | good | 60 µm | |
| | | MACSCREEN, 8128 | Base | Bad | 70 µm | not measurable |
| | | | treated | good | 60 µm | |
| | | MACal, 9829 S | Base | Bad | 60 µm | not measurable |
| | | | treated | good | 60 µm | |
| | | MACal, 8929 S | Base | Bad | 60 µm | not measurable |
| | | | treated | good | 60 µm | |
| | | JT 1629 P | Base | good | 70 µm | 1.09 |
| | | | treated | good | 50-60 µm | 1.48 |
| | | JT 1628 P | Base | good | 80 µm | 1.50 |
| | | | treated | good | 70 µm | 1.73 |
| | | JT 1828 R | Base | good | 90 µm | 1.21 |
| | | | treated | good | 70-80 µm | 1.69 |
| | | JT 1829 R | Base | good | 110 µm | 3.00 |
| | | | treated | good | 60 µm | 3.12 |
| | | JT 1820 P | Base | good | 80-90 µm | 1.28 |
| | | | treated | good | 70-80 µm | 1.65 |
| | | 3112 | Base | Bad | Impossible to measure | |
| | | | treated | good | | |
| | | JT 1028 P | Base | good | 50 µm | 1.86 |
| | | | treated | good | 50 µm | 1.75 |
| Avery Dennison | Self-Adhesive | IPM Banner AD | Base | Bad | 80 µm | not measurable |
| | | | treated | good | 70 µm | |
| | | MPI 1003 | Base | Bad | 60 µm | not measurable |
| | | | treated | good | 60 µm | |
| | | MPI 2002 AD | Base | Bad | 60 µm | not measurable |
| | | | treated | good | 60 µm | |
| | | IPM 2031 | Base | good | 70-80 µm | 1.19 |
| | | | treated | good | 70-80 µm | 1.90 |

Table 3

|  | 61A | 61B | 61C | 61D | 61E |
|---|---|---|---|---|---|
| ZnAc | 13.14% | 13.14% | 13.14% | 13.14% | 13.14% |
| CaCl2 | 3.30% | 3.30% | 3.30% | 3.30% | 3.30% |
| Propyl acetate | 5% | 0 | 0 | 0 | 0 |
| Butyl acetate | 0 | 5% | 0 | 0 | 0 |
| Butyl lactate | 0 | 0 | 5% | 0 | 0 |
| Ethyl lactate | 0 | 0 | 0 | 5% | 0 |
| Ethyl acetate | 0 | 0 | 0 | 0 | 5% |
| DEGBE | 5% | 5% | 5% | 5% | 5% |
| Ethanol | 39.85% | 32% | 12.35% | 7.35% | 12.35% |
| Water | 33.71% | 41.56% | 61.21% | 66.21% | 61.21% |

Table 4

|  | 61A | 61B | 61C | 61D | 61E |
|---|---|---|---|---|---|
| O.D. before abrasion | 2.01 | 1.95 | 2.26 | 2.13 | 2.06 |
| O.D. after abrasion | 1.78 | 1.76 | 1.85 | 1.80 | 1.94 |
| O.D. decrease | -11% | -10% | -18% | -15% | -6% |

Table 5

|  | 62A | 62B | 62C | 62D | 62E |
|---|---|---|---|---|---|
| ZnAc | 13.14% | 13.14% | 13.14% | 13.14% | 13.14% |
| CaCl2 | 3.30% | 3.30% | 3.30% | 3.30% | 3.30% |
| Propyl acetate | 5% | 0 | 0 | 0 | 0 |
| Butyl acetate | 0 | 5% | 0 | 0 | 0 |
| Butyl lactate | 0 | 0 | 5% | 0 | 0 |
| Ethyl lactate | 0 | 0 | 0 | 5% | 0 |
| Ethyl acetate | 0 | 0 | 0 | 0 | 5% |
| BG | 5% | 5% | 5% | 5% | 5% |
| Ethanol | 39.85% | 32% | 12.35% | 7.35% | 12.35% |
| Water | 33.71% | 41.56% | 61.21% | 66.21% | 61.21% |

Table 6

|  | 62A | 62B | 62C | 62D | 62E |
|---|---|---|---|---|---|
| O.D. before abrasion | 2.26 | 2.06 | 2.22 | 2.20 | 1.96 |
| O.D. after abrasion | 1.94 | 1.90 | 1.97 | 1.78 | 1.73 |
| O.D. decrease | -14% | -8% | -11% | -19% | -12% |

Table 7

|  | 63a | 63B | 63C | 63D | 63E |
|---|---|---|---|---|---|
| ZnAc | 13.14% | 13.14% | 13.14% | 13.14% | 13.14% |
| CaCl2 | 3.30% | 3.30% | 3.30% | 3.30% | 3.30% |
| Propyl acetate | 5% | 0 | 0 | 0 | 0 |
| Butyl acetate | 0 | 5% | 0 | 0 | 0 |
| Butyl lactate | 0 | 0 | 5% | 0 | 0 |
| Ethyl lactate | 0 | 0 | 0 | 5% | 0 |
| Ethyl acetate | 0 | 0 | 0 | 0 | 5% |
| DPM | 5% | 5% | 5% | 5% | 5% |
| Ethanol | 39.85% | 32% | 12.35% | 7.35% | 12.35% |
| Water | 33.71% | 41.56% | 61.21% | 66.21% | 61.21% |

Table 8

|  | 63a | 63B | 63C | 63D | 63E |
|---|---|---|---|---|---|
| O.D. before abrasion | 1.93 | 1.96 | 2.27 | 2.16 | 2.17 |
| O.D. after abrasion | 1.90 | 1.75 | 1.89 | 1.86 | 1.80 |
| O.D. decrease | -2% | -11% | -17% | -14% | -17% |

Table 9

| O.D. before abrasion | 1.88 |
|---|---|
| O.D. after abrasion | 1.71 |
| O.D. decrease | -9% |

Table 10

|  | Salt | Color change |
|---|---|---|
| 65A | ZnAc | No change |
| 65B | ZnCl$_2$ | Substrate became reddish |
| 65C | CaCl$_2$ | No change |

Table 11:

| Sample | Coated /Uncoated | O.D. Magenta | O.D. Cyan | Drop Diameter |
|---|---|---|---|---|
| 1 | Uncoated | 1.83 | 1.27 | 0.22 (wavy edges) |
| 2 | Coated | 2.0 | 1.36 | 0.2 (sharp edges) |

SURFACE TREATMENT FOR PRINTING APPLICATIONS USING WATER-BASED INK

CROSS REFERENCE TO RELATED APPLICATIONS

This application claims benefit of U.S. Provisional Application No. 60/261,267, filed Jan. 16, 2001.

FIELD OF THE INVENTION

The present invention relates to a recording method, and more particularly, to a surface treatment of the recording media surface, prior to the deposition of ink on the media.

BACKGROUND OF THE INVENTION

Printing applications using water-based ink include ink jet, flexography, gravure and screen-printing. The ink compositions used in these methods contain a water-soluble dye dissolved in water or in a combination of water with an organic solvent or a dispersed pigment.

Inks may be colored using either dyes or pigments. It is generally pointed out that an image obtained when using ink containing a water-soluble dye has poor water fastness and light fastness. In an image obtained when using ink containing a pigment as a colorant, however, the colorant is likely to be left near the surface of the recording medium. An image obtained by ink containing pigment as a colorant has light fastness. This unsatisfactory fixation of the colorant on the surface of the recording medium results in the formation of a print in which, when the image is rubbed, the recording medium becomes smeared with the pigment. Prior art methods propose the addition of a resin to the ink composition in order to improve the fixation of the colorant onto the recording medium. The resin functions as a binder to strongly fix the colorant onto the recording medium. For example, laid-open Japanese Patent Application No. 07-157668 demonstrates a conventional resin-containing ink composition including, for example, an ink comprising a colorant dispersed in a water-insoluble, resin emulsion dispersion.

An ink jet recording method is a printing method wherein droplets of an ink composition are ejected and deposited onto a recording medium. This printing method has a feature that an image having high resolution and high quality can be realized at high speed with a relatively inexpensive apparatus.

U.S. Pat. No. 4,381,185 discloses a simple process to obtain a water-fast print on paper using a colorant solution containing water-soluble polymeric dyes. This is accomplished by using a paper employing substantial cation content, especially a substantial polyvalent metal ion content for example, $Fe^{2+}$, $Fe^{3+}$, $Cu^{2+}$, $Zn^{2+}$, $Al^{3+}$, $Mg^{2+}$, $Ca^{2+}$ and $Ba^{2+}$, and applying a solution containing one or more polymeric colorants possessing anionic net charge, for example, anionic groups.

Another ink jet recording method has been proposed in Laid-Open Japanese Patent Application No. 05-202328. This method comprises applying a polyvalent metal salt solution onto a recording medium and then applying an ink composition containing a dye having at least one carboxyl group. According to this method, polyvalent metal ions combine with the dye to form a precipitate, which can provide a high quality image having water resistance, and which is free from color bleeding.

Recording methods that comprise the steps of printing two solutions, a first solution and an ink composition, such as JP Application 05-202328 have also been disclosed by way of example, in U.S. Pat. No. 5,948,512. A first solution contains a polyvalent metal salt and/or a polyallylamine, which is used in combination with an ink composition containing an inorganic oxide colloid, and optionally an epoxy-containing compound. The first solution is deposited onto a recording medium, and the ink composition is then deposited by ink jet printing, realizing an evenly printed image with no significant feathering, which is free from color bleeding.

Further, U.S. Pat. No. 6,084,619 presents an ink jet recording method in which a reaction solution and an ink composition are used to print on a recording medium. The reaction solution comprises a polyvalent metal salt, and the ink composition comprises a pigment and a resin emulsion. This method is capable of providing an image having good quality.

Another example of printing with two solutions is disclosed in U.S. Pat. No. 6,086,197, which presents an ink jet recording method including the step of depositing a reaction solution and an ink composition onto a recording medium. The ink composition used has a colorant, a resin emulsion and the like and the reaction solution has a reactant reactive with the colorant and/or the resin emulsion to produce an agglomerate, such as a polyvalent metal salt or a polyalylamine. The reaction solution and the ink composition each has a surface tension of less than 40 mN/m, reached by an addition of an anionic surfactant.

Yet another example is, U.S. Pat. No. 6,080,229, which discloses a reaction solution for use in a two solution ink jet recording method. The reaction solution comprises at least a polyvalent metallic salt and a component selected from the group consisting of five or six-member saturated or unsaturated, heterocyclic compound containing at least one nitrogen atom, an optionally alkyl-substituted amide derivative, a sulfur-containing compound, an amine, and a cationic surfactant. It possesses improved storage stability, can improve printing stability, and in addition, can offer a printed image having improved quality.

The two-solution printing method as described in the above patents, which uses a reaction solution and an ink composition, gives a good solution to the printing quality achieved on porous material such as papers and a fair solution to mechanical stability. However, the image mechanical stability, e.g., abrasion resistance and scratch resistance, on non/low-porous materials such as vinyl, anodized metal, various types of coated papers etc., is very poor. The prior art patents do not deal with this problem. When reaction solution is deposited on a non/low-porous material and then rapidly followed by the deposition of the ink composition, the two solutions react and precipitate all ink solids to form an ink dot. However, this precipitate ink dot has no interaction with the non/low-porous surface, as the reaction solution tends to form a liquid boundary between the ink and the recording media's surface. This mechanism damages the mechanical stability of the image, making it easy to rub off.

Recording media are generally not thermally stable and when exposed to high temperatures undergo a change in color. Prior art methods which use the two-solution printing method further compromise the thermal stability of the recording media, i.e., a recording media which has been treated with reaction solution and is subjected to a drying process tends to change its color at a significantly lower temperature than untreated media. The media turns slightly reddish to brown-black, depending on the dryer temperature and the polyvalent metal comprised in the reaction solution.

It would be desirable to provide a new surface treatment for printing applications using water-based ink, which would provide a quality printed image with increased mechanical and chemical stability and which would provide thermal stability so as to preserve true color of the recording media.

SUMMARY OF THE INVENTION

Accordingly, it is a broad object of the present invention to overcome the problems of the prior art and provide a surface treatment for printing applications using water-based ink with improved properties.

A general object of the present invention is to provide a method of surface treatment for printing applications using water-based ink that can realize a good image.

Another object of the present invention is to provide a pretreatment liquid for use in the surface treatment for printing applications using water-based ink.

A more specific object of the present invention is to provide a method of surface treatment for printing applications using water-based ink involving printing of ink on a highly porous or non/low-porous, low surface energy media.

Yet another object of the present invention is to provide a method of surface treatment for printing applications using water-based ink which can realize an image that is highly mechanically stable.

A further object of the present invention is to a method of surface treatment for printing applications using water-based ink which can realize an image that is highly chemically stable.

A still further object of the present invention is to provide a method of surface treatment for printing applications using water-based ink that provides thermal stability.

In accordance with a preferred embodiment of the present invention there is provided a method of printing media surface treatment for printing applications using water-based ink comprising the steps of:

applying a pretreatment liquid comprising a polyvalent metallic salt and at least one of a polymer swelling reagent and a coalescence reagent on to a surface of a recording medium to provide a pretreated recording medium;

allowing the pretreatment liquid to partially dry;

printing an ink composition onto the pretreated recording medium; and drying the pretreated recording medium having the ink composition thereon at high temperature.

There is also provided a pretreatment liquid for printing applications using water-based ink comprising: a polyvalent metallic salt and at least one of a polymer swelling reagent and a coalescence reagent.

The surface treatment for printing applications using water-based ink of the present invention comprises a surface pretreatment of the recording media prior to the deposition of the ink on the surface, wherein the pretreatment liquid is an aqueous and/or alcoholic solution or an oil in water emulsion containing a polyvalent metal salt, and at least one of an organic swelling reagent and a coalescence reagent. The pretreatment liquid is applied with a rubbing motion in a thin layer of approximately 4 $\mu$m to the entire upper surface of the recording media. The swelling reagent and/or the coalescence reagent cause the upper 3–5 $\mu$m to swell and the polyvalent metal cations become embedded in the surface. After partial drying of the pretreated media, ink composition is deposited onto the surface to form an image. The ink solids precipitate in response to the embedded cations deposited in the pretreatment, and form interactions above and below the surface of the media to give a mechanically stable ink dot. Post-print drying at temperatures high enough to evaporate the swelling reagent and/or the coalescence reagent, the ink dot remains embedded in the surface of the media.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which:

FIG. 1a shows a cross-section of a non/low-porous, low surface energy printing medium;

FIG. 1b shows a drop of low surface tension ink jet ink placed on the above printing medium surface;

FIG. 1c demonstrates ink dot formation by a phase separation mechanism after the above ink reacts with reaction solution placed on the above printing surface;

FIG. 1d shows a dried ink dot on the surface of the above printing medium;

FIGS. 2-5 illustrate the new surface treatment for inkjet printing applications of the present invention.

Table 1 summarizes the test results from tests made on wall cover vinyls;

Table 2 summarizes the test results from tests made on self-adhesive vinyls;

Table 3 describes different surface pretreatment liquids used in example 61;

Table 4 summarizes the results of the tests that were performed as per table 3;

Table 5 describes different surface pretreatment liquids used in example 62;

Table 6 summarizes the results of the tests that were performed as per table 5;

Table 7 describes different surface pretreatment liquids used in example 63;

Table 8 summarizes the results of the tests that were performed as per table 7;

Table 9 summarizes the results of example 64;

Table 10 summarizes the color change in the recording medium; and

Table 11 describes the results of flexographic printing.

DETAILED DESCRIPTION OF A PREFERRED EMBODIMENT

Figure 1A:
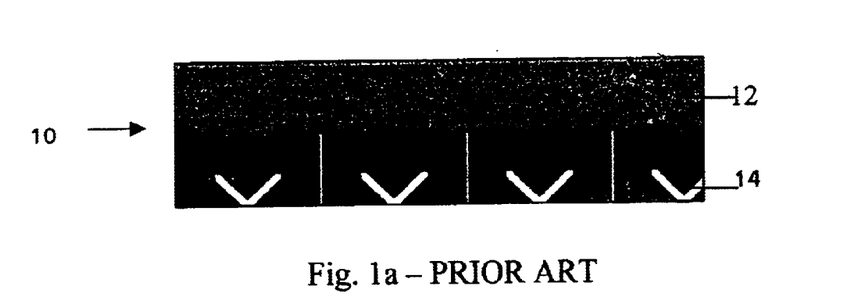
FIGS. 1a-d show the method of the prior art two solution printing process.
Figure 1B:
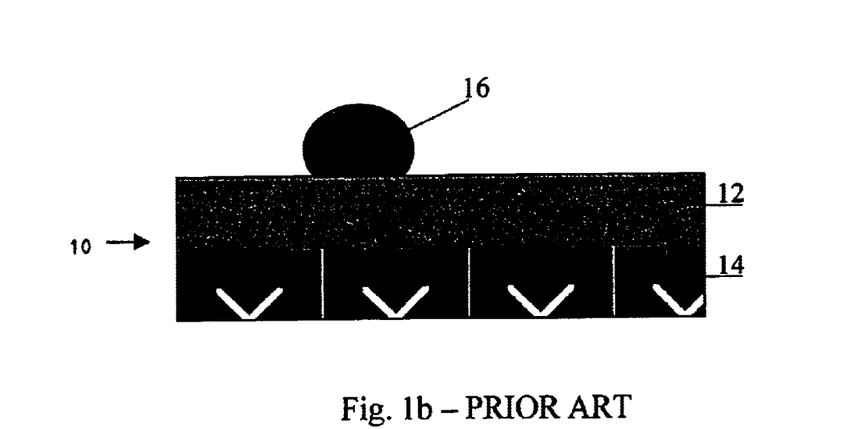
Figure 1C:
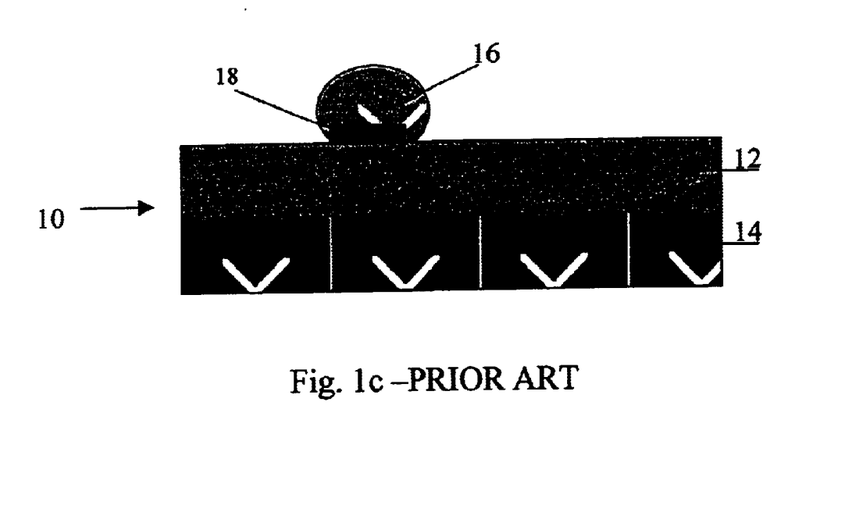
Figure 1D:
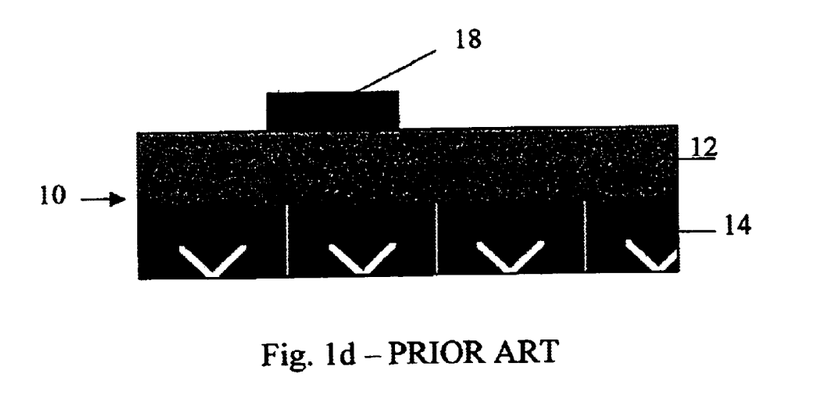

FIGS. 1a-d illustrate the prior art two-solution printing method. Referring now to FIG. 1a, there is shown standard non/low-porous, low surface energy printing medium 10, which is comprised of two layers. Upper layer 12 is a low surface energy material like vinyl, in and lower layer 14 is a paper used as the backbone of recording medium 10. Recording medium 10 has been treated with a reaction solution such as those described in the prior art. In FIG. 1b, a drop of low surface tension ink jet ink 16 is placed on upper layer 12 of printing medium 10. FIG. 1c demonstrates dot 18 formation caused by the interaction of the ink with the reaction solution deposited on upper layer 12. Dot 18 forms on top of the surface of upper layer 12. FIG. 1d shows ink dot 18 after it has dried and remains on the surface of upper layer 12 of printing medium 10. Interaction and adhesive forces occur only on the contact interface between the dry ink dot 18 and the surface of the upper layer 12, giving ink dot 18 poor mechanical stability.

Figure 2:
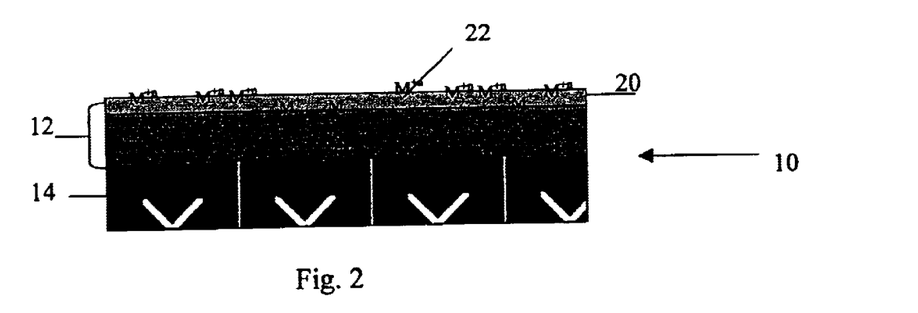
FIG. 2 shows a cross-section of a non/low-porous, low surface energy printing medium which has been treated with the surface pretreatment liquid of the present invention.

FIG. 2 refers to a standard non/low-porous, low surface energy printing medium 10, which has been pretreated with the pretreatment liquid of the present invention. The pretreatment liquid deposition onto the recording medium may be carried out by applying a thin layer (not more than 4 $\mu$m, wet), preferably using a rubbing motion. The surface pretreatment liquid used in the present invention comprises a polyvalent metallic salt, a water-soluble polymer swelling reagent and a coalescence reagent and may be used as a solution or an emulsion.

The polyvalent metal salt in the pretreatment liquid is comprised of divalent or higher polyvalent metallic ions and anions bonded to the polyvalent metallic ions and is soluble in water, alcohol or a mixture of both. Specific examples of polyvalent metallic ions include divalent metallic ions, such as a $Ca^{2+}$, $Zn^{2+}$, $Ba^{2+}$, $Mg^{2+}$, and trivalent metallic ions such as $Al^{3+}$, $Fe^{3+}$ and $Cr^{3+}$. Anions include $Cl^-$, $I^-$, $Br^-$, $NO_3^-$, $RCOO^-$ (where R is H or any hydrocarbon chain) and $SO_4^{-2}$. A metal salt comprised of the metallic ions $Zn^{+2}$ and $Ca^{+2}$, provides especially favorable results in terms of image mechanical stability and lack of media damage (in terms of color and texture). The concentration of the polyvalent metal salt in the pretreatment liquid may be suitably determined so as to attain the effect of providing a good print quality with no negative effect on the recording media. It is, however, preferably approximately 0.1% to 30% by weight, more preferably approximately 2% to 25% by weight.

According to the present invention, the polyvalent metal salt anions are preferably a chloride ($Cl^-$) or an acetate ($CH_3COO^-$), for optimal thermal stability.

According to a first embodiment of the present invention there is provided a pretreatment liquid comprising a polymer swelling reagent. The presence of a swelling reagent enables the polyvalent metal salt to insert into the media surface and be implanted in it. Preferred examples of swelling reagent are N-methyl pyrrolidone, esters such as, ethyl acetate, propyl acetate, butyl acetate, ethyl lactate, butyl lactate etc., ketones such as acetone and methyl-ethyl-ketone (MEK) and cyclic ethers such as THF. The concentration of the swelling reagent in the pretreatment liquid may be suitably determined so as to attain the effect of providing a good print quality with a highly mechanically stable image and no negative effect on the recording media. It, however, is preferably approximately 0.1% to 15% by weight, more preferably approximately 0.5% to 7.5% by weight.

According to second embodiment of the present invention the pretreatment liquid comprises a coalescence reagent. The presence of a coalescence reagent enables the creation of a stable dot shape with good film properties. These good film properties promote the mechanical stability of the dot and consequently of the entire image. Preferred example of coalescence reagent are Butyl glycol, Butyl carbitol, di(propylene glycol)methyl ether (DPM), tripropylene glycol mono methyl ether (TPM), propylene glycol mono methyl ether, propylene glycol mono propyl ether, dipropylene glycol dimethyl ether. The concentration of the coalescence reagent in the pretreatment liquid may be suitably determined so as to attain the effect of providing a good print quality with a highly mechanically stable image and no negative effect on the recording media It, however, is preferably approximately 0.1% to 15% by weight, more preferably approximately 0.5% to 6% by weight. Swelling reagents and coalescence reagents may be used together.

The top 3–5 $\mu$m layer of the upper printing media's surface 12 is swelled by the pretreatment liquid creating swelled surface 20. Polyvalent metal salt 22 becomes embedded in the swelled surface 20. After the pretreatment liquid is applied, the surface is allowed to partially dry.

Figure 3:
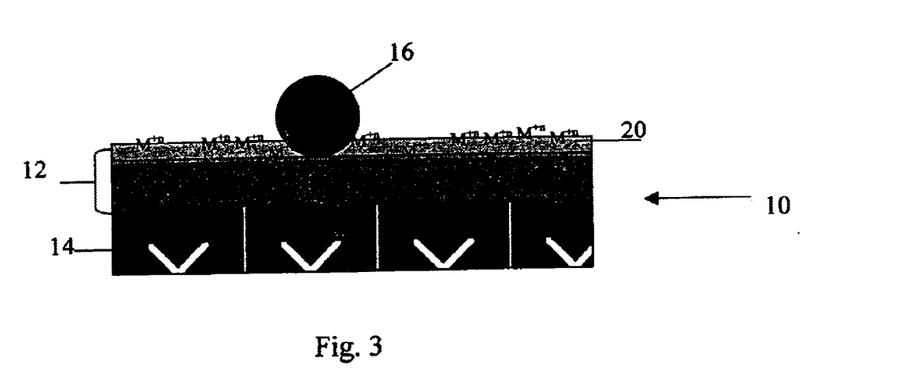
FIG. 3 shows a drop of low surface tension ink jet ink placed on the pretreated printing medium surface.

FIG. 3 shows a drop of low surface tension ink jet ink 16 placed on media 10 which has been treated to obtain swelled surface 20 and allowed to partially dry. Ink jet ink 16 is comprised of a colorant and a resin. Due to the swelling of the top 3–5 $\mu$m layer of the upper printing media's surface 12, ink drop 16 has partially penetrated swelled surface 20.

Figure 4:
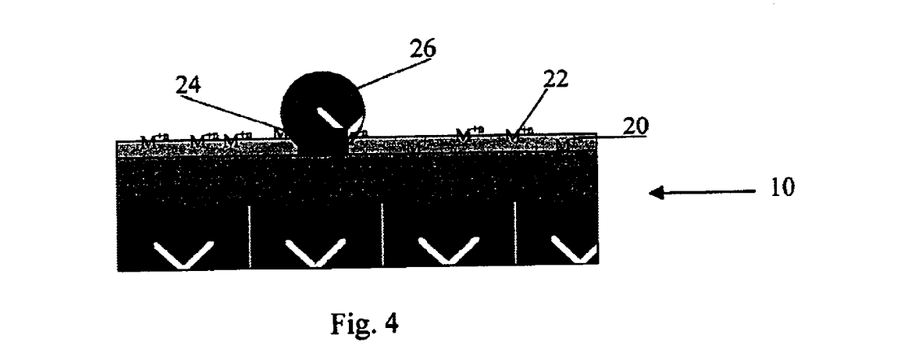
FIG. 4 demonstrates ink dot formation by phase separation mechanism.

FIG. 4 demonstrates the formation of ink dot 24 by a phase separation mechanism. Dot 24 is composed of the resin and colorant found in the ink and is implanted into swelled surface 20 of medium 10 while the ink liquids 26 remain on the surface of media 10. The presence of the coalescence reagent and polyvalent metal salt 22 embedded in swelled surface 20, creates a stable dot shape with good film properties.

Figure 5:
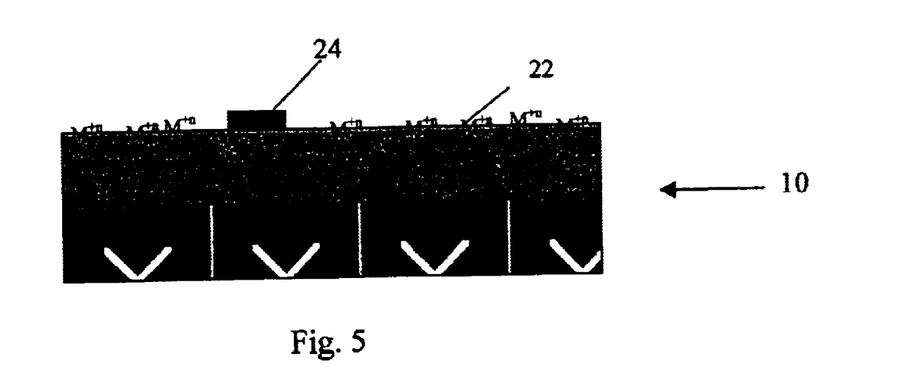
FIG. 5 illustrates the printed ink dot on the dried printing medium surface.

FIG. 5 illustrates printed ink dot 24 on dried surface 12. After dot formation the media is dried at high temperatures to evaporate the swelling reagent and/or coalescence reagent so that upper layer 12 returns to its basically solid state. Dot 24 is thereby implanted in layer 12, to provide an ink dot with a strong mechanical stability.

According to the surface treatment for printing applications using water-based applications of the present invention, mechanically and chemically stable good quality printing can be realized by bringing the treatment solution into contact with the recording media surface, prior to the deposition of the ink composition. The surface must then be partially dry, at least from all the water, before the deposition of the ink composition.

Although the present invention is not intended to be bound by the following hypothesis, it is hypothesized that the reason why a mechanically and chemically superior image can be achieved by the present invention is as follows. Upon exposure of the low energy surface to the treatment solution the swelling reagent interacts with the surface and swells the top 3–5 $\mu$m layer of upper layer 12 of the printing media. The local swelling enables the coalescence reagent and the polyvalent metal ions to penetrate into swelled surface 20 and embed in it. Upon contact of the ink composition with the activated, swelled surface a phase separation occurs resulting in agglomeration of the ink's colorant and resin. The agglomerates are formed into well-defined dot 24 with good film properties due to the presence of the coalescence reagent. Because of the swelled state of the upper layer 12 dot 24 is stabilized in the surface of recording media 10. Upon drying, the swelling reagent and the coalescence reagent are evaporated from the surface returning it to its original state, leaving the image implanted into upper layer 12. Furthermore, color bleeding in a color image, that is, uneven color mixing at the boundaries of different colors, can also be advantageously prevented.

The results of analyses of wall cover vinyl are shown in Table 1. Note that dot diameter is consistently lower in treated samples than in non-treated samples showing that there is less spread of the ink dot. These are the results of tests performed in Examples 1–16 below. Similarly, in Table 2 there are shown the results of tests done on self-adhesive vinyl with different surface textures and qualities. Here too there is consistent improvement in print quality with the treated samples and often decreased dot diameter and optical density showing that the ink is being held in place and is not spreading. These are the results of tests performed in Examples 17–58.

Specific examples follow:

EXAMPLE 1

A surface pre-treating solution consisting of 13.14% ZnAc, 3.3% $CaCl_2$, 5% N-Methyl-2-pyrrolidone (NMP), 5% di(ethylene glycol)butyl ether (DEGBE) and 73.56% deionized water, was prepared. A 4 μm layer of treatment solution was deposited on a wall cover vinyl sold under the trade name SCL 90/90 SMW3, using RK rod. The coated vinyl was dried at 45° C. for 10 sec. It was then placed on an XY bed, where it was imaged (600 dpi image) using the inkjet print head described in EP640481, assigned to Aprion. After printing, the image was dried at 150–170° C. for 15 sec. The following quality and mechanical tests were performed to the dry image: optical density measurements using reflection densitometer model D19C from GRETAG, rub resistance using rub tester model A7 from Wallace (200 rds/2 Lb load), scratch resistance, water resistance, detergent resistance, dot diameter using Carton microscope and color change of the treated, unprinted areas.

EXAMPLE 2

An untreated wall cover vinyl sold under the trade name SCL 90/90 SMW3, as a control to example 1, was placed on an XY bed, where it was imaged (600 dpi image) using the inkjet print head described in EP640481, assigned to Aprion. After printing, the image was dried at 150–170° C. for 15 sec. Quality and mechanical tests were performed to the dry image as described in example 1.

EXAMPLE 3

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a wall cover vinyl sold under the trade name SCL 90/90 (182), using RK rod. The coated vinyl was dried at 45° C. for 10 sec. Then it was placed on an XY bed, where it was imaged (600 dpi image) using the inkjet print head described in EP640481, assigned to Aprion. After printing, the image was dried at 150–170° C. for 15 sec. Quality and mechanical tests were performed to the dry image as described in example 1.

EXAMPLE 4

An untreated wall cover vinyl sold under the trade name SCL 90/90 (182), as a control to example 3, was placed on an XY bed, where it was imaged (600 dpi image) using the inkjet print head described in EP640481, assigned to Aprion. After printing, the image was dried at 150–170° C. for 15 sec. Quality and mechanical tests were performed to the dry image as described in example 1.

EXAMPLE 5

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a wall cover vinyl sold under the triad name SCL 90/90 XER3, using RK rod. The treated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 6

An untreated wall cover vinyl sold under the triad name SCL 90/90 XER3, as a reference to example 5, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 7

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm coating layer was deposited on a wall cover vinyl sold under the triad name SCL 80/90 DT319, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 8

An untreated wall cover vinyl sold under the triad name SCL 80/90 DT319, as a reference to example 7, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 9

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was was deposited on a wall cover vinyl sold under the triad name SCL 90/120 LTE15, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 10

An untreated wall cover vinyl sold under the triad name SCL 90/120 LTE15, as a reference to example 9, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 11

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 $\mu$m layer of treatment solution was deposited on a wall cover vinyl sold under the triad name Chamberline 90/90, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 12

An untreated a wall cover vinyl sold under the triad name Chamberline 90/90, as a reference to example 11, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 13

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 $\mu$m layer of treatment solution was deposited on a wall cover vinyl sold under the triad name Forbo 90/90, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 14

An untreated a wall cover vinyl sold under the triad name Forbo 90/90, as a reference to example 13, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 15

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 $\mu$m layer of treatment solution was deposited on a non woven substrate sold under the trade name Borastapeter 4811, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 16

An untreated non woven substrate sold under the trade name Borastapeter 4811, as a reference to example 15, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 17

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 $\mu$m layer of treatment solution was deposited on a self-adhesive vinyl sold under the trade name Multi fix digital white premium, using RK rod. The coated vinyl was dried at 45° C. for 10 sec. Then it was placed on an XY bed, where it was imaged (600 dpi image) using the inkjet print head described in EP640481, assigned to Aprion. After printing, the image was dried at 150–170° C. for 15 sec. Quality and mechanical tests were performed to the dry image as described in example 1.

EXAMPLE 18

An untreated self-adhesive vinyl sold under the trade name Multi fix digital white premium, as a reference to example 17, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 19

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 $\mu$m layer of treatment solution was deposited on a self-adhesive vinyl sold under the trade name MII International 72A premium, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 20

An untreated a self-adhesive vinyl sold under the trade name MII International 72A premium s, as a reference to example 19, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 21

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 $\mu$m layer of treatment solution was deposited on a self-adhesive vinyl sold under the trade name BUSmark FLXcon, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170°

C. for 15 sec. Quality and mechanical tests were performed to the dry image as described in example 1.

EXAMPLE 22

An untreated self-adhesive vinyl sold under the trade name BUSmark FLXcon, as a reference to example 21, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 23

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name JAC SERILUX 70100 DURO-E 110, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 24

An untreated self-adhesive vinyl sold under the trade name JAC SERILUX 70100 DURO-E 110 se, as a reference to example 23, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 25

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on self-adhesive vinyl sold under the trade name JAC SERILUX 72100 DURO-E 110, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 26

An untreated self-adhesive vinyl sold under the trade name JAC SERILUX 72100 DURO-E 110, as a reference to example 25, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 27

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name JAC SIGN INKJET 70102 NONPERM A5, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 28

An untreated self-adhesive vinyl sold under the trade name JAC SIGN INKJET 70102 NONPERM A5, as a reference to example 27, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 29

A surface pre-treating solution consisting of 13.14% ZnAc, 3.3% $CaCl_2$, 5% a N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Mactac MACSCREEN 8129, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 30

An untreated self-adhesive vinyl sold under the trade name Mactac MACSCREEN 8129, as a reference to example 29, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 31

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Mactac MACSCREEN 8128, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 32

An untreated a self-adhesive vinyl sold under the trade name Mactac MACSCREEN 8128, as a reference to example 31, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 33

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on self-adhesive vinyl sold under the trade name Mactac MACal 9829 S, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 34

An untreated self-adhesive vinyl sold under the trade name Mactac MACal 9829, as a reference to example 33, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 35

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Mactac MACal 8929 S, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were preformed to the dry image as described in example 1.

EXAMPLE 36

An untreated self-adhesive vinyl sold under the trade name Mactac MACal 8929 S, as a reference to example 35, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 37

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Mactac JT 1629 P, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 38

An untreated self-adhesive vinyl sold under the trade name Mactac JT 1629 P, as a reference to example 37, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 39

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4μm layer of treatment solution was deposited on a self-adhesive vinyl sold under the trade name Mactac JT 1628 P, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 40

An untreated self-adhesive vinyl sold under the trade name Mactac JT 1628 P, as a reference to example 39, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 41

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Mactac JT 1828 R, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 42

An untreated self-adhesive vinyl sold under the trade name Mactac JT 1828 R, as a reference to example 41, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 43

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Mactac JT 1829 R, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 44

An untreated self-adhesive vinyl sold under the trade name Mactac JT 1829 R, as a reference to example 43, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 45

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Mactac JT 1820 P, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 46

An untreated self-adhesive vinyl sold under the trade name Mactac JT 1820 P, as a reference to example 45, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 47

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Mactac JT 1028 P, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 48

An untreated self-adhesive vinyl sold under the trade name Mactac JT 1028 P, as a reference to example 47, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 49

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4μm layer of treatment solution was deposited on a self-adhesive vinyl sold under the trade name Avery Dennison 3112, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 50

An untreated self-adhesive vinyl sold under the trade name Avery Dennison 3112, as a reference to example 49, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 51

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on self-adhesive vinyl sold under the trade name Avery Dennison IMP Banner AD, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 52

An untreated self-adhesive vinyl sold under the trade name Avery Dennison IPM Banner AD, as a reference to example 51, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 53

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Avery Dennison MPI 1003, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 54

An untreated self-adhesive vinyl sold under the trade name Avery Dennison MPI 1003, as a reference to example 53, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 55

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Avery Dennison MPI 2002 AD, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 56

An untreated self-adhesive vinyl sold under the trade name Avery Dennison MPI 2002 AD, as a reference to example 55, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 57

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a self-adhesive vinyl sold under the trade name Avery Dennison IPM 2031, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 58

An untreated self-adhesive vinyl sold under the trade name Avery Dennison IPM 2031, as a reference to example 57, was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 59

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a wall cover vinyl sold under the trade name SCL 90/90 XER3, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 60

A surface pre-treating solution consisting of 13.14% ZnAc, 3.3% $CaCl_2$, 5% N-Methyl-2-pyrrolidone (NMP), 5% Di(ethylene glycol)butyl ether (DEGBE) and 73.56% deionized water, was prepared. A 4 μm layer of treatment solution was deposited on a wall cover vinyl sold under the trade name SCL 90/90 XER3, using RK rod. The coated vinyl was dried at 45° C. for 10 sec. Then it was placed on an XY bed, where it was imaged (600 dpi image) using the inkjet print head described in EP640481 assigned to Aprion. After printing, the image was dried at 150–170° C. for 15 sec. Quality and mechanical tests were performed to the dry image as described in example 1.

EXAMPLE 61

Wall cover vinyl sold under the trade name SCL 90/90 XER3 was buffed with different surface pretreatment liquids as described in table 3. Ink was applied to the treated surface by 12 μm RK rod. The film was then dried at 150–170° C. for 15 sec. Mechanical tests were performed to the dry film as described in example 1. Table 4 summarizes the results of the tests that were performed as per table 3.

EXAMPLE 62

Wall cover vinyl sold under the trade name SCL 90/90 XER3 was buffed with different surface pretreatment liquids as described in table 5. Ink was applied to the treated surface by 12 μm RK rod. The film was then dried at 150–170° C. for 15 sec. Mechanical tests were performed to the dry film as described in example 1. Table 6 summarizes the results of tests that were performed as per table 5.

EXAMPLE 63

Wall cover vinyl sold under the trade name SCL 90/90 XER3 was buffed with different surface pretreatment liquids as described in table 7. Ink was applied to the treated surface by 12 μm RK rod. The film was then dried at 150–170° C. for 15 sec. Mechanical tests were performed to the dry film as described in example 1. Table 8 summarizes the results of tests that were performed as per table 7.

EXAMPLE 64

A surface pre-treating emulsion consisting of 13.14% ZnAc, 3.3% $CaCd_2$, 5% Twin 20 (HLB 16.7), 10% Butyl lactate and 68.56% deionized water, was prepared according to the following procedure: forming an emulsion of Butyl lactate in water stabilized by Twin 20 (HLB 16.7), then adding the salts to form a Butyl lactate emulsion in aqueous salt solution. A 4 μm layer of treatment solution was smeared on a wall cover vinyl sold under the trade name SCL 90/90 XER3, using RK rod. After the coated vinyl was dried at 45° C. for 10 sec, ink was applied to the treated surface by 12 μm RK rod. The film was then dried at 150–170° C. for 15 sec. Mechanical tests were performed to the dry film as described in example 1. Table 9 summarizes the results of example 64.

EXAMPLE 65

A surface pretreating liquid consisting of 0.8M ZnAc salt or $ZnCl_2$ salt or $CaCl_2$ salt and deionized water, was prepared. A 4 μm layer of treatment solution was smeared on a wall cover vinyl sold under the trade name SCL 90/90 SMW3, using an RK rod. Each of the coated vinyl was placed in the oven for 1 minute at 170° C., while leaving a reference out of the oven. After the samples were taken out, the color change of the substrate was compared to the reference. Table 10 summarizes the color change in the recording medium.

EXAMPLE 66

A surface pre-treating solution consisting of 7.5% $CaCl_2$, 2% $ZnCl_2$ in 1:1 water: Ethanol solution was hand rubbed on a coated corrugated board. The board was placed on a Master-flex by Bobst mobile 160FT printer. A non-treated coated corrugated board was printed under the same conditions. The results of the flexographic printing are described in table 11.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

TABLE 1-continued

| Company | Application | Grade | Treated | Dot diameter |
|---|---|---|---|---|
| FORBO | Wall cover | Vinyl 90/90 | non | 70 μm |
|  |  |  | Treated | 60 μm |
| Chamberlin | Wall cover | CP 90/90 | non | 75 μm |
|  |  |  | Treated | 65 μm |
| Borasrtapeter | Wall cover | 4811 Non Woven Lystil | non | 85 μm |
|  |  |  | Treated | 75 μm |

TABLE 2

| Company | Application | Grade | Coating | Print quality | Dot diameter | Optical density |
|---|---|---|---|---|---|---|
| Multi Fix | Self-Adhesive | Digital white - premium | Base treated | Bad good | Impossible to measure |  |
| Formely Meyercord International Inc. | Self-Adhesive | 72 A, premium vinyl | Base treated | Bad good | Impossible to measure |  |
| BUSmark | Self-Adhesive | FLXcon | Base treated | Bad Good | Impossible to measure |  |
| Jac | Self-Adhesive | SERILUX, 70100, DURO-E 110 | Base treated | Bad good | Impossible to measure |  |
|  |  | SERILUX, 72100, DURO-E 110 | Base treated | Bad good | Impossible to measure |  |
|  |  | SIGN INKJET, 70102, NONPERM A5 | Base treated | Bad good | Impossible to measure |  |
| Mactac | Self-Adhesive | MACSCREEN, 8129 | Base treated | Bad good | 60 μm 60 μm | not measurable |
|  |  | MACSCREEN, 8128 | Base treated | Bad good | 70 μm 60 μm | not measurable |
|  |  | MACal, 9829 S | Base treated | Bad good | 60 μm 60 μm | not measurable |
|  |  | MACal, 8929 S | Base treated | Bad good | 60 μm 60 μm | not measurable |
|  |  | JT 1629 P | Base treated | good good | 70 μm 50–60 μm | 1.09 1.48 |
|  |  | JT 1628 P | Base treated | good good | 80 μm 70 μm | 1.50 1.73 |
|  |  | JT 1828 R | Base treated | good good | 90 μm 70–80 μm | 1.21 1.69 |
|  |  | JT 1829 R | Base treated | good good | 110 μm 60 μm | 3.00 3.12 |
|  |  | JT 1820 P | Base treated | good good | 80–90 μm 70–80 μm | 1.28 1.65 |
|  |  | 3112 | Base treated | Bad good | Impossible to measure |  |
|  |  | JT 1028 P | Base treated | good good | 50 μm 50 μm | 1.86 1.75 |
| Avery Dennison | Self-Adhesive | IPM Banner AD | Base treated | Bad good | 80 μm 70 μm | not measurable |
|  |  | MPI 1003 | Base treated | Bad good | 60 μm 60 μm | not measurable |
|  |  | MPI 2002 AD | Base treated | Bad good | 60 μm 60 μm | not measurable |
|  |  | IPM 2031 | Base treated | good good | 70–80 μm 70–80 μm | 1.19 1.90 |

TABLE 1

| Company | Application | Grade | Treated | Dot diameter |
|---|---|---|---|---|
| Speciality Coating | Wall cover | 90/90 SMW3 | non | 70 μm |
|  |  |  | Treated | 60 μm |
| Speciality Coating | Wall cover | 90/90 Standar 182 | non | 70 μm |
|  |  |  | Treated | 65 μm |
| Speciality Coating | Wall cover | 90/90 XER3 | non | 75 μm |
|  |  |  | Treated | 65 μm |
| Speciality Coating | Wall cover | 80/90 DT319 | non | 70 μm |
|  |  |  | Treated | 60 μm |
| Speciality Coating | Wall cover | 90/120 LTE 15 | non | 75 μm |
|  |  |  | Treated | 60 μm |

TABLE 3

|  | 61A | 61B | 61C | 61D | 61E |
|---|---|---|---|---|---|
| ZnAc | 13.14% | 13.14% | 13.14% | 13.14% | 13.14% |
| CaCl2 | 3.30% | 3.30% | 3.30% | 3.30% | 3.30% |
| Propyl acetate | 5% | 0 | 0 | 0 | 0 |
| Butyl acetate | 0 | 5% | 0 | 0 | 0 |
| Butyl lactate | 0 | 0 | 5% | 0 | 0 |
| Ethyl lactate | 0 | 0 | 0 | 5% | 0 |
| Ethyl acetate | 0 | 0 | 0 | 0 | 5% |
| DEGBE | 5% | 5% | 5% | 5% | 5% |
| Ethanol | 39.85% | 32% | 12.35% | 7.35% | 12.35% |
| Water | 33.71% | 41.56% | 61.21% | 66.21% | 61.21% |

TABLE 4

|  | 61A | 61B | 61C | 61D | 61E |
|---|---|---|---|---|---|
| O.D. before abrasion | 2.01 | 1.95 | 2.26 | 2.13 | 2.06 |
| O.D. after abrasion | 1.78 | 1.76 | 1.85 | 1.80 | 1.94 |
| O.D. decrease | −11% | −10% | −18% | −15% | −6% |

TABLE 5

|  | 62A | 62B | 62C | 62D | 62E |
|---|---|---|---|---|---|
| ZnAc | 13.14% | 13.14% | 13.14% | 13.14% | 13.14% |
| CaCl2 | 3.30% | 3.30% | 3.30% | 3.30% | 3.30% |
| Propyl acetate | 5% | 0 | 0 | 0 | 0 |
| Butyl acetate | 0 | 5% | 0 | 0 | 0 |
| Butyl lactate | 0 | 0 | 5% | 0 | 0 |
| Ethyl lactate | 0 | 0 | 0 | 5% | 0 |
| Ethyl acetate | 0 | 0 | 0 | 0 | 5% |
| BG | 5% | 5% | 5% | 5% | 5% |
| Ethanol | 39.85% | 32% | 12.35% | 7.35% | 12.35% |
| Water | 33.71% | 41.56% | 61.21% | 66.21% | 61.21% |

TABLE 6

|  | 62A | 62B | 62C | 62D | 62E |
|---|---|---|---|---|---|
| O.D. before abrasion | 2.26 | 2.06 | 2.22 | 2.20 | 1.96 |
| O.D. after abrasion | 1.94 | 1.90 | 1.97 | 1.78 | 1.73 |
| O.D. decrease | −14% | −8% | −11% | −19% | −12% |

TABLE 7

|  | 63a | 63B | 63C | 63D | 63E |
|---|---|---|---|---|---|
| ZnAc | 13.14% | 13.14% | 13.14% | 13.14% | 13.14% |
| CaCl2 | 3.30% | 3.30% | 3.30% | 3.30% | 3.30% |
| Propyl acetate | 5% | 0 | 0 | 0 | 0 |
| Butyl acetate | 0 | 5% | 0 | 0 | 0 |
| Butyl lactate | 0 | 0 | 5% | 0 | 0 |
| Ethyl lactate | 0 | 0 | 0 | 5% | 0 |
| Ethyl acetate | 0 | 0 | 0 | 0 | 5% |
| DPM | 5% | 5% | 5% | 5% | 5% |
| Ethanol | 39.85% | 32% | 12.35% | 7.35% | 12.35% |
| Water | 33.71% | 41.56% | 61.21% | 66.21% | 61.21% |

TABLE 8

|  | 63a | 63B | 63C | 63D | 63E |
|---|---|---|---|---|---|
| O.D. before abrasion | 1.93 | 1.96 | 2.27 | 2.16 | 2.17 |
| O.D. after abrasion | 1.90 | 1.75 | 1.89 | 1.86 | 1.80 |
| O.D. decrease | −2% | −11% | −17% | −14% | −17% |

TABLE 9

| O.D. before abrasion | 1.88 |
|---|---|
| O.D. after abrasion | 1.71 |
| O.D. decrease | −9% |

TABLE 10

|  | Salt | Color change |
|---|---|---|
| 65A | ZnAc | No change |
| 65B | ZnCl$_2$ | Substrate became reddish |
| 65C | CaCl$_2$ | No change |

TABLE 11

| Sample | Coated/Uncoated | O.D. Magenta | O.D. Cyan | Drop Diameter |
|---|---|---|---|---|
| 1 | Uncoated | 1.83 | 1.27 | 0.22 (wavy edges) |
| 2 | Coated | 2.0 | 1.36 | 0.2 (sharp edges) |

What is claimed is:

1. A method of printing media surface treatment for printing applications using water-based ink, said method comprising the steps of:

applying a pretreatment liquid comprising a polyvalent metallic salt and at least one of a polymer swelling reagent and a coalescence reagent on to a surface of a recording medium to provide a pretreated recording medium;

allowing said pretreatment liquid to partially dry;

printing an ink composition onto said pretreated recording medium; and drying the pretreated recording medium having the ink composition thereon at high temperature.

2. The method of claim 1 wherein said application step includes applying said pretreatment liquid with a rubbing motion.

3. The method of claim 1 wherein said application step applies a layer of up to approximately 10 μm thickness when wet.

4. The method of claim 1 wherein said recording medium is non-porous.

5. The method of claim 4 wherein said recording medium is vinyl.

6. The method of claim 1 wherein said recording medium has low porosity.

7. The method of claim 6 wherein said recording medium is coated paper.

8. The method of claim 1 wherein said ink composition is comprised of a colorant and a resin.

9. The method of claim 8 wherein said resin is an acrylic resin comprising at least one acidic group.

10. The method of claim 8 wherein said resin is in an aqueous emulsion.

11. The method of claim 8 wherein said resin is in an aqueous solution.

* * * * *